United States Patent
Hakola et al.

(10) Patent No.: US 12,212,395 B2
(45) Date of Patent: Jan. 28, 2025

(54) BEAM DIVERSITY FOR MULTI-SLOT COMMUNICATION CHANNEL

(71) Applicant: Nokia Technologies Oy, Espoo (FI)

(72) Inventors: Sami-Jukka Hakola, Kempele (FI); Mihai Enescu, Espoo (FI); Timo Koskela, Oulu (FI); Juha Pekka Karjalainen, Oulu (FI); Jorma Johannes Kaikkonen, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 625 days.

(21) Appl. No.: 17/279,396

(22) PCT Filed: Sep. 28, 2018

(86) PCT No.: PCT/EP2018/076414
§ 371 (c)(1),
(2) Date: Mar. 24, 2021

(87) PCT Pub. No.: WO2020/064119
PCT Pub. Date: Apr. 2, 2020

(65) Prior Publication Data
US 2021/0391912 A1    Dec. 16, 2021

(51) Int. Cl.
*H04B 7/06* (2006.01)
*H04B 7/0408* (2017.01)
*H04W 72/044* (2023.01)

(52) U.S. Cl.
CPC ......... *H04B 7/0695* (2013.01); *H04B 7/0408* (2013.01); *H04W 72/046* (2013.01)

(58) Field of Classification Search
CPC .... H04B 7/0695; H04B 7/0408; H04B 7/088; H04B 7/0877; H04B 7/0404;
(Continued)

(56) References Cited

U.S. PATENT DOCUMENTS 10,952,231 B2 *   3/2021   Liou ............... H04W 72/046
11,129,161 B2 *   9/2021   Guo ................ H04W 72/542
(Continued)

FOREIGN PATENT DOCUMENTS

| CN | 107852220 A | 3/2018 |
| CN | 108092754 A | 5/2018 |
| WO | 2013/100719 A1 | 7/2013 |

OTHER PUBLICATIONS

"3rd Generation Partnership Project; Technical Specification Group Radio Access Network; NR;Physical layer procedures for data (Release 15)", 3GPP TS 38.214, V15.2.0, Jun. 2018, pp. 1-94.
(Continued)

*Primary Examiner* — Brian T O Connor
(74) *Attorney, Agent, or Firm* — SQUIRE PATTON BOGGS (US) LLP (57) ABSTRACT

Systems, methods, apparatuses, and computer program products for applying beam diversity for multi-slot physical downlink shared channel (PDSCH) are provided. One method may include receiving configuration of a multi-slot transmission mode for a multi-slot communication channel. The method may also include receiving, based on the configuration of the multi-slot transmission mode, transmission configuration indications of a plurality of transmit beams for slots in the multi-slot communication channel. A selected set of candidate transmit beams may be received among the plurality of transmit beams for the slots in the multi-slot communication channel. The method may also include determining, among the selected set of candidate transmit beams, which transmit beam is used for each slot in the multi-slot communication channel, and applying a reception beam corresponding to each transmit beam used for each slot in the multi-slot communication channel.

19 Claims, 4 Drawing Sheets

(58) Field of Classification Search
CPC .. H04B 7/0469; H04B 7/0417; H04B 7/0617; H04B 7/0691; H04W 72/046; H04W 52/365; H04W 72/23; H04W 8/24; H04W 52/0229; H04W 52/0235; H04W 52/0248; H04W 52/0274; H04W 52/028; H04W 72/1273; H04W 24/08; H04W 24/10; H04W 72/231; H04W 72/232; H04L 5/0023; H04L 5/0048; H04L 5/0053; Y02D 30/70

See application file for complete search history.

(56) References Cited

U.S. PATENT DOCUMENTS

| | | | | |
|---|---|---|---|---|
| 11,212,825 B2* | 12/2021 | Gong | | H04L 1/1664 |
| 11,304,188 B2* | 4/2022 | John Wilson | | H04W 72/23 |
| 11,399,365 B2* | 7/2022 | Li | | H04W 72/23 |
| 11,575,484 B2* | 2/2023 | Noh | | H04W 72/541 |
| 11,582,734 B2* | 2/2023 | Guo | | H04L 5/0053 |
| 11,641,258 B2* | 5/2023 | Guo | | H04W 72/21 370/336 |
| 11,665,703 B2* | 5/2023 | Huang | | H04L 5/0053 370/329 |
| 11,678,323 B2* | 6/2023 | Gong | | H04L 5/0055 370/329 |
| 11,723,049 B2* | 8/2023 | Xi | | H04W 24/08 370/329 |
| 11,924,025 B2* | 3/2024 | Kang | | H04L 41/0677 |
| 2018/0220398 A1 | 8/2018 | John Wilson et al. | | |
| 2018/0220403 A1 | 8/2018 | John Wilson et al. | | |
| 2020/0084756 A1* | 3/2020 | John Wilson | | H04B 7/0695 |
| 2020/0288479 A1* | 9/2020 | Xi | | H04B 7/088 |
| 2021/0314218 A1* | 10/2021 | Kang | | H04B 7/088 |
| 2021/0351888 A1* | 11/2021 | Park | | H04W 72/51 |
| 2022/0039122 A1* | 2/2022 | Park | | H04W 72/1268 |
| 2022/0312395 A1* | 9/2022 | Li | | H04L 5/0053 |

OTHER PUBLICATIONS

"3rd Generation Partnership Project; Technical Specification Group Radio Access Network; NR; Multiplexing and channel coding (Release 15)", 3GPP TS 38.212, V15.2.0, Jun. 2018, pp. 1-98.

"3rd Generation Partnership Project; Technical Specification Group Radio Access Network; NR;Medium Access Control (MAC) protocol specification(Release 15)", 3GPP TS 38.321, V15.2.0, Jun. 2018, pp. 1-73.

"3rd Generation Partnership Project; Technical Specification Group Radio Access Network; NR;Radio Resource Control (RRC) protocol specification(Release 15)", 3GPP TS 38.331, V15.2.1, Jun. 2018, pp. 1-303.

International Search Report and Written Opinion received for corresponding Patent Cooperation Treaty Application No. PCT/EP2018/076414, dated May 24, 2019, 12 pages.

"On Beam Management, Measurement and Reporting", 3GPP TSG RAN WG1 Meeting 90bis, R1-1717605, Agenda : 7.2.2.3, Samsung, Oct. 9-13, 2017, 16 pages.

"Beam Management for NR", 3GPP TSG-RAN WGI Meeting #94, R1-1809711, Agenda : 7.1.2.3, Qualcomm Incorporated, Aug. 20-24, 2018, 16 pages.

"Multi-beam Transmission for Robustness", 3GPP TSG RAN WG 1 Meeting #89, R1-1708136, Agenda : 7.1.2.2.3, Huawei, May 15-19, 2017, pp. 1-5.

Action received for corresponding European Patent Application No. 18782017.0, dated Mar. 23, 2023, 6 pages.

Office Action received for corresponding Indian Patent Application No. 202147017830, dated Feb. 11, 2022, 7 pages.

Office action received for corresponding Chinese Patent Application No. 201880099813.7, dated Nov. 28, 2023, 10 pages of office action and 7 pages of translation available.

Xiao et al., "Resource allocation in multiuser multi-antenna OFDM systems based on beamforming", Journal of Huazhong University of Science and Technology (Natural Science Edition), vol. 35, No. 6, Jun. 2006, pp. 23-26.

Office action received for corresponding Chinese Patent Application No. 201880099813.7, dated Jun. 21, 2024, 4 pages of office action and 4 pages of translation available.

* cited by examiner

BEAM DIVERSITY FOR MULTI-SLOT COMMUNICATION CHANNEL

RELATED APPLICATION

This application claims priority to PCT Application No. PCT/EP2018/076414, filed on Sep. 28, 2018, which is incorporated herein by reference in its entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain embodiments may relate to beam diversity for multi-slot communication channel.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) or new radio (NR) wireless systems refer to the next generation (NG) of radio systems and network architecture. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G or NR, the nodes that can provide radio access functionality to a user equipment (i.e., similar to Node B in E-UTRAN or eNB in LTE) may be referred to as a next generation or 5G Node B (gNB).

SUMMARY

One embodiment may be directed to a method which may include receiving configuration of a multi-slot transmission mode for a multi-slot communication channel. The method may also include receiving, based on the configuration of the multi-slot transmission mode, transmission configuration indications of a plurality of transmit beams for slots in the multi-slot communication channel. A selected set of candidate transmit beams among the plurality of transmit beams for the slots in the multi-slot communication channel may be selected. Further, the method may include determining, among the selected set of candidate transmit beams, which transmit beam is used for each slot in the multi-slot communication channel, and include applying a reception beam corresponding to each transmit beam used for each slot in the multi-slot communication channel.

Another embodiment may be directed to an apparatus. The apparatus may include at least one processor, and at least one memory including computer program code. The at least one memory and computer program code may be configured, with the at least one processor, to cause the apparatus at least to receive configuration of a multi-slot transmission mode for a multi-slot communication channel, and receive, based on the configuration of the multi-slot transmission mode, transmission configuration indications of a plurality of transmit beams for slots in the multi-slot communication channel. The apparatus may also be caused to receive a selected set of candidate transmit beams among the plurality of transmit beams for the slots in the multi-slot communication channel, and caused to determine, among the selected set of candidate transmit beams, which transmit beam is used for each slot in the multi-slot communication channel. Further, the apparatus may be caused to apply a reception beam corresponding to each transmit beam used for each slot in the multi-slot communication channel.

Another embodiment may be directed to an apparatus which may include circuitry configured to receive configuration of a multi-slot transmission mode for a multi-slot communication channel, and circuitry configured to receive, based on the configuration of the multi-slot transmission mode, transmission configuration indications of a plurality of transmit beams for slots in the multi-slot communication channel. The apparatus may also include circuitry configured to receive a selected set of candidate transmit beams among the plurality of transmit beams for the slots in the multi-slot communication channel, and determine, among the selected set of candidate transmit beams, which transmit beam is used for each slot in the multi-slot communication channel. In addition, the apparatus may include circuitry configured to apply a reception beam corresponding to each transmit beam used for each slot in the multi-slot communication channel.

Another embodiment may be directed to an apparatus which may include means for receiving configuration of a multi-slot transmission mode for a multi-slot communication channel, and means for receiving, based on the configuration of the multi-slot transmission mode, transmission configuration indications of a plurality of transmit beams for slots in the multi-slot communication channel. The apparatus may also include means for receiving a selected set of candidate transmit beams among the plurality of transmit beams for the slots in the multi-slot communication channel, and means for determining, among the selected set of candidate transmit beams, which transmit beam is used for each slot in the multi-slot communication channel. In addition, the apparatus may include means for applying a reception beam corresponding to each transmit beam used for each slot in the multi-slot communication channel.

In an example embodiment, the determining may be performed based on received downlink control information. In another example embodiment, each slot of the multi-slot communications channel may include a corresponding physical downlink shared channel. According to an example embodiment, the method may also include determining, from the selected set of candidate transmit beams, the transmit beams to be used by a network node for each slot in the multi-slot communication channel.

In an example embodiment, each slot in the multi-slot communication channel may include a corresponding CSI-RS. According to a further example embodiment, the method may include assigning, from among the selected set of candidate transmit beams, a transmit beam for each CSI-RS. In an example embodiment, the transmit beam selected for each of the slots in the multi-slot communication channel is the same as the transmit beam selected for each CSI-RS.

Another embodiment may be directed to another method which may include configuring a user equipment with a multi-slot communication channel, and assigning the user equipment with a set of transmission configuration indications of a plurality of transmit beams for slots in the multi-slot communication channel. The method may also include selecting a set of candidate transmit beams among the plurality of transmit beams for the slots in the multi-slot communication channel, and identifying which one of the selected set of candidate transmit beams are for use by the user equipment. In addition, the method may include configuring the user equipment to implement the identified selected set of candidate transmit beams for the slots in the multi-slot communication channel.

Another embodiment may be directed to another apparatus. The apparatus may include at least one processor, and at least one memory including computer program code. The at least one memory and computer program code may be configured, with the at least one processor, to cause the apparatus at least to configure a user equipment with a multi-slot communication channel, and assign the user equipment with a set of transmission configuration indications of a plurality of transmit beams for slots in the multi-slot communication channel. The apparatus may also be caused to select a set of candidate transmit beams among the plurality of transmit beams for the slots in the multi-slot communication channel, and identify which one of the selected set of candidate transmit beams are for use by the user equipment. In addition, the apparatus may be caused to configure the user equipment to implement the identified selected set of candidate transmit beams for the slots in the multi-slot communication channel.

Another embodiment may be directed to another apparatus which may include circuitry configured to configure a user equipment with a multi-slot communication channel, and circuitry configured to assign the user equipment with a set of transmission configuration indications of a plurality of transmit beams for slots in the multi-slot communication channel. The apparatus may also include circuitry configured to select a set of candidate transmit beams among the plurality of transmit beams for the slots in the multi-slot communication channel, and circuitry to identify which one of the selected set of candidate transmit beams are for use by the user equipment. The apparatus may further include circuitry configured to configure the user equipment to implement the identified selected set of candidate transmit beams for the slots in the multi-slot communication channel.

Another embodiment may be directed to another apparatus which may include means for configuring a user equipment with a multi-slot communication channel, and means for assigning the user equipment with a set of transmission configuration indications of a plurality of transmit beams for slots in the multi-slot communication channel. The apparatus may also include means for selecting a set of candidate transmit beams among the plurality of transmit beams for the slots in the multi-slot communication channel, and means for identifying which one of the selected set of candidate transmit beams are for use by the user equipment. The apparatus may further include means for configuring the user equipment to implement the identified selected set of candidate transmit beams for the slots in the multi-slot communication channel.

In an example embodiment, each slot of the multi-slot communication channel may include a physical downlink shared channel. In another example embodiment, the another method may also include applying transmission beam switching for each physical downlink shared channel of each slot in the multi-slot communication channel, and configuring the user equipment with a CSI-RS resource set, wherein each CSI-RS resource in the CSI-RS resource set is associated with a corresponding slot in the multi-slot communication channel. The another method may also include applying transmission beam switching for each CSI-RS and each physical downlink shared channel of each slot in the multi-slot communication channel. In an example embodiment, the same transmission beam switching may be used for each CSI-RS and each physical downlink shared channel.

Another embodiment may be directed to a non-transitory computer readable medium, which may include program instructions stored thereon for performing the functions of any one or more of the various embodiments described above.

BRIEF DESCRIPTION OF THE DRAWINGS

For proper understanding of the invention, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. Thus, the following detailed description of some example embodiments of systems, methods, apparatuses, and computer program products for beam diversity for multi-slot physical downlink shared channel (PDSCH), is not intended to limit the scope of certain embodiments but is representative of selected example embodiments.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily all refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain example embodiments, and not in limitation thereof.

Beam indication for downlink signals and channels defined in 3$^{rd}$ Generation Partnership Project (3GPP) RE115 may rely on a transmission configuration indication (TCI) framework where the user equipment (UE) may be configured with multiple TCI states and then either via a radio resource control (RRC), medium access control (MAC) command, or downlink control information (DCI) signaling certain TCI state may be applied for the given target signal or channel. Further, each TCI state may be configured with one or two reference signals (RSs) that act as a source in quasi co-location wise (i.e., RSs act as QCL sources for the target signal or channel).

There may be four different QCL types: A, B, C, and D. QCL type D may be a spatial reception (RX) parameter and RS that is acting as QCL type D source for the certain target signal or channel defines the used transmit beam, which indicates how the UE should form its receiver beam.

In 3GPP, beam indication for a physical downlink control channel (PDCCH) is defined. In PDCCH, UE may be configured using RRC signaling up to 64 TCI states in a control resource set (CORESET) where each state may have one reference signal to provide a spatial domain parameter. For instance, the spatial domain parameter may be provided to characterize the transmit beam and, thus, correspondingly the RX beam at the UE. In addition, the reference signal may be a synchronization sequence/physical broadcast channel (SS/PBCH) block or a channel state information-reference signal (CSI-RS) used for beam management or time-frequency tracking. CORESET may define the time and frequency resources from where the UE searches PDCCH candidates, and PDCCH may be transmitted using different aggregation levels (ALs). Thus, the UE may need to search PDCCH on CORESET trying different ALs. One TCI state per CORESET may be active at a time. Further, to activate a certain TCI state, the gNB may need to transmit a MAC control element (CE) activation command.

Additionally, in PDCCH, the UE may be configured up to three CORESETs. For instance, CORESET 0 may be for scheduling both broadcast and unicast traffic to the UE. A separate spatial domain parameter configuration and activation signaling may be provided for each CORESET.

In PDSCH, the UE may be configured for using RRC signaling up to 64 TCI states where each state may have one reference signal to provide the spatial domain parameter, such as, for example, to characterize the transmit beam and, thus, the RX beam at the UE. Furthermore, a MAC CE activation command may be used to select up to eight TCI states from which one may be dynamically indicated by DCI when scheduling the PDSCH.

In one example, DCI to schedule DL PDSCH may be transmitted in PDCCH, and the DCI for PDSCH allocation may include DCI format 1_1 for scheduling PDSCH in one cell. In addition, an identifier for DCI formats–1 bits may be transmitted by means of the DCI format 1_1 with cyclic redundancy check (CRC) scrambled by cell radio network temporary identifier (C-RNTI) or configured scheduling RNTI (CS-RNTI) or new-RNTI. Further, the value of the bit field may be set to 1, indicating a DL DCI format. Moreover, a transmission configuration indication may be set to 0 bit if a higher layer parameter tci-PresentInDCI is not enabled. Otherwise, the transmission configuration indication may be set to 3 bits. Additionally, TCI in DCI may be used to signal the applied transmission (TX) beam for the PDSCH transmission. There is a need, therefore, to build a signaling mechanism to enable beam diversity for the multi-slot PDSCH.

According to certain embodiments, robustness for the multi-slot PDSCH may be improved by introducing, for example, beam diversity where a different beamformer may be applied for the PDSCHs in the multi-slot transmission. This may be beneficial in situations and scenarios subject to high blocking, but also to reduce the need for beam reporting with high periodicity (high system overhead, especially with analog/hybrid beamforming architectures at above 6 GHz).

Certain example embodiments may relate to 3GPP New Radio (NR) physical layer design. For instance, certain example embodiments may enhance slot aggregation defined for PDSCH. Slot aggregation (or multi-slot) PDSCH may be designed for coverage extension. The same transport block (TB) with rank 1 may be repeated using as different redundancy version in each consecutive aggregationFactorDL slot.

For example, when a UE is configured with an aggregationFactorDL>1, the same symbol allocation may be applied across the aggregationFactorDL consecutive slots. The UE may expect that the TB is repeated within each symbol allocation among each of the aggregationFactorDL consecutive slots and the PDSCH may be limited to a single transmission layer. Further, the redundancy version to be applied on the nth transmission occasion of the TB may be determined according to Table 1 shown below.

TABLE 1

| Applied redundancy version when aggregationFactorDL > 1 | | | | |
|---|---|---|---|---|
| $rv_{id}$ indicated by | $rv_{id}$ to be applied to n$^{th}$ transmission occasion | | | |
| the DCI scheduling the PDSCH | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

For a basic repetition mode of operation in the multi-slot PDSCH transmission, the UE may or may not assume that the scheduled PDSCH can be transmitted using scheduling offset less than that reported of the Threshold-Sched-Offset. In an example embodiment, the Threshold-Sched-Offset may be a parameter provided by the UE. Specifically, it may indicate a minimum delay time between the PDCCH (scheduling PDSCH) and PDSCH when the gNB can apply a different TX beam for the PDSCH (e.g., more narrow) than used for the PDSCH. If the first PDSCH can be scheduled with scheduling offset less than the reported threshold value, the PDSCHs may be transmitted using the same transmit beam as the PDCCH providing the scheduling grant. That is, the transmission coordination indication (TCI) state applied for the PDCCH reception may be assumed for the reception of the aggregated PDSCHs. If the first PDSCH is transmitted with a scheduling offset equal to or greater than the reported threshold, the scheduling DCI may explicitly indicate transmit beams for the PDSCHs. For instance, DCI may include a TCI state, such as when tci-PresentInDCI is set to "enabled," which may be applied for the PDSCH reception. In certain example embodiments, the tci-PresentInDCI may be a parameter indicating whether or not the PDCCH (scheduling PDSCH) is having in DCI (scheduling command) a TCI field to indicate certain transmit beams for the PDSCH. According to an example embodiment, the transmit beams may be different than the TX beam for the PDCCH if scheduling delay is equal to or greater than the Threshold-Sched-Offset. If the tci-PresentInDCI parameter is disabled, then the PDSCH may be transmitted using the same TX beam as the PDCCH.

According to certain example embodiments, the gNB may select a subset of the activated TCI states of the PDSCH in the scheduling command (DCI) for the multi-slot PDSCH to apply beam diversity (i.e., different transmit or transmission (TX) beam for PDSCHs sent in different slots). For instance, in an example embodiment, in case of when the aggregationFactorDL is greater than 1, a 3-bit state in DCI may be re-interpreted (or alternatively, signaled in a new/specific DCI format) so that the 3-bit indicator can be used to select the number of TCI states applied for the multi-slot PDSCH transmission.

In an example embodiment, the 3-bit indicator may select the first three activated TCI states with a 3-bit bitmap by masking one, two or three states. Further, the 3-bit bitmap may be an n-bit up to a maximum number of activated TCI states for the PDSCH.

In another example embodiment, the first indicated TCI state (beam) may be applied for the PDSCH of the first slot, the second TCI state (beam) may be applied for the PDSCH of the second slot, and so on. In case the number of indicated TCI states n is less than the aggregationFactorDL, a modulo operation may be used to determine the TCI state transmit beam for a certain PDSCH.

For example, according to an example embodiment, the $m^{th}$ PDSCH may apply an activated TCI state number modulo(m, n), where m={0, . . . , aggregationFactorDL-1}. For instance, in a case where the aggregationFactorDL is 4 and TCI selects two first activated TCI states, the applied TCI state (which indicates QCL Type D source RS for the PDSCH, i.e., transmit beam for the PDSCH for each PDSCH slot) may be set forth according to that shown in Table 2 below.

TABLE 2

Applied TCI state for each PDSCH slot (two selected TCI states)

| Index of activated TCI states for PDSCH | Transmission number in multi-slot PDSCH | Applied TCI state |
|---|---|---|
| 0 | 0 | 0 |
| 1 | 1 | 1 |
|   | 2 | 0 |
|   | 3 | 1 |

In another example embodiment, in a case where the aggregationFactorDL is 4 and TCI selects three first activated TCI states, the applied TCI state (which indicates QCL Type D source RS for the PDSCH, i.e., transmit beam for the PDSCH for each PDSCH slot) may be set forth according to that shown in Table 3 below.

TABLE 3

Applied TCI state for each PDSCH slot (three selected TCI states)

| Index of activated TCI states for PDSCH | Transmission number in multi-slot PDSCH | Applied TCI state |
|---|---|---|
| 0 | 0 | 0 |
| 1 | 1 | 1 |
| 2 | 2 | 2 |
|   | 3 | 0 |

In an example embodiment, the operations described with reference to Tables 2 and 3 above may be controlled by an additional higher layer parameter which controls the use of interpretation of the TCI field in the DCI, or indicated in a specific/new DCI format. Alternatively, in an example embodiment, beam diversity transmission mode may be activated for the multi-slot PDSCH when the number of activated TCI states for PDSCH is greater than one. In this case, the need to introduce a higher layer parameter to distinguish this from the baseline multi-slot transmission mode may be eliminated. Moreover, in another example embodiment, in a fallback operation, the gNB may select one of the activated TCI states for the multi-slot PDSCH. For example, the gNB may use a 3-bit bitmap that selects one of the first three activated TCI states for PDSCH.

Figure 1:
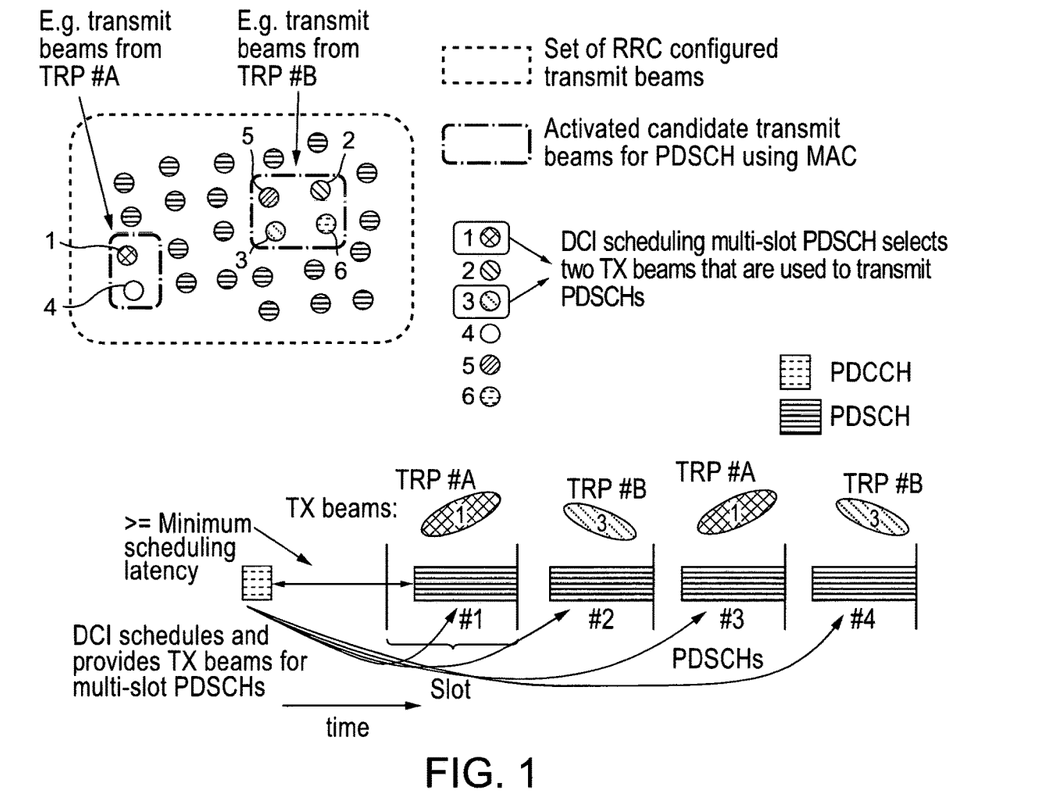
FIG. 1 illustrates a beam diversity scheme upon scheduled multi-slot physical downlink shared channel according to an example embodiment.

FIG. 1 illustrates a beam diversity scheme upon scheduled multi-slot PDSCH according to an example embodiment. Specifically, the beam diversity scheme in FIG. 1 includes a set of RRC configured transmit beams. Within the set of RRC configured transmit beams, a set of activated candidate transmit beams for PDSCH using MAC may be present. The set of activated candidate transmit beams may include a varying number of activated transmit beams. For instance, in one example embodiment, the activated set of transmit beams may include two activated transmit beams such as #1 and #4. According to another example embodiment, the activated set of transmit beams may include four different activated transmit beams such as #2, #3, #5, and #6. However, other example embodiments may include a different number of activated transmit beams in a set. Further, FIG. 1 illustrates a communication channel with multiple slots, wherein each slot includes a corresponding PDSCH #1 to #4, and further illustrates communication interactions between each slot and the PDCCH based on DCI schedules. In an example embodiment. In addition, FIG. 1 illustrates that the interactions may occur when the aggregationFactorDL is greater than or equal to the minimum scheduling latency.

Figure 2:
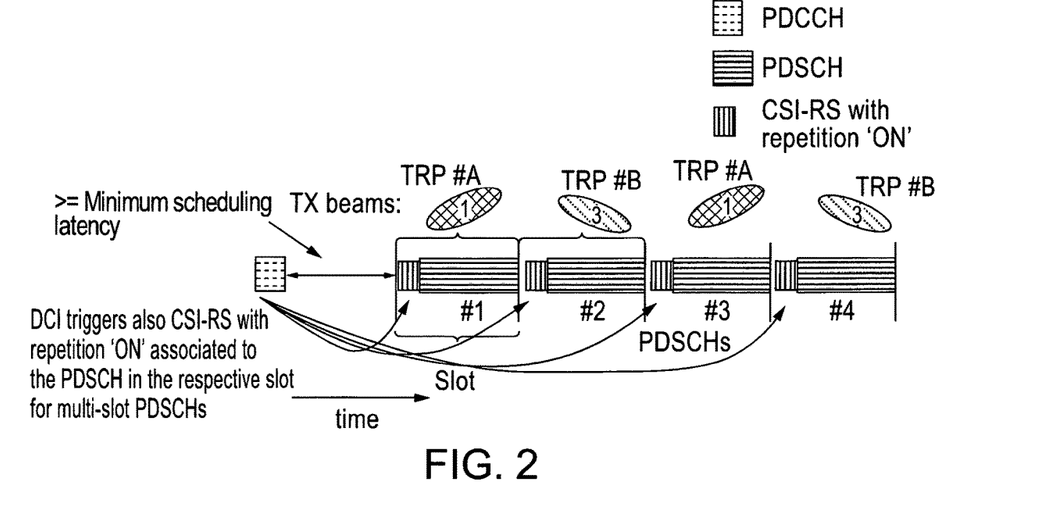
FIG. 2 illustrates triggering of channel state information-reference signal for user equipment (UE) RX beam training according to an example embodiment.

Further, FIG. 2 illustrates triggering of CSI-RS for UE RX beam training at the beginning of each PDSCH in each respective slot according to an example embodiment. As illustrated in FIG. 2, the transmit beam configuration and activation follows that illustrated in FIG. 1. Further, as illustrated in FIGS. 1 and 2, the gNB may select two ($1^{st}$ and $3^{rd}$) of the activated candidate beams for the PDSCH multi-slot PDSCH transmissions. According to an example embodiment, the DCI scheduling the beam diversity transmission for the multi-slot PDSCH may also trigger CSI-RS with repetition "ON" in the beginning or before each PDSCH time domain allocation in the slot. This allows the UE to first train its RX beam for the reception of the following PDSCH in the slot and, thus, improve the detection and decoding. For instance, in an example embodiment, training may involve the gNB (transmitter) transmitting a reference signal (CSI-RS) using the same TX beam in multiple consecutive symbols, and the UE may try using a different RX beam on each symbol. In other words, the UE can train its RX beam. Moreover, in an example embodiment, the TCI state applied for the triggered CSI-RS with repetition follows the TCI state applied for the PDSCH in the respective slot as defined in the above example embodiments.

In an example embodiment, the UE may be configured with a multi-slot PDSCH transmission so that transmit beams follow activated transmit beams of certain CORE-SETs. For instance, the UE may be configured such that multi-slot PDSCH transmission may be scheduled from configured CORESET #1 and CORESET #2. When the multi-slot PDSCH transmission is scheduled from CORESET #1, the first PDSCH may be transmitted using the transmit beam activated for the CORESET #1 (i.e., the same TX beam as for PDCCH transmitted on CORESET #1). In addition, the second PDSCH may be transmitted using the transmit beam activated for the CORESET #2, the third PDSCH may be transmitted again using the transmit beam activated for the CORESET #3, and so on.

According to an example embodiment, in DCI scheduling, the multi-slot PDSCH transmission may have, for example, a one-bit field to indicate whether or not the beam diversity using the activated transmit beams of certain CORESETs is used. If the beam diversity using the activated transmit beams of certain CORESETs is not used, then the multi-slot PDSCH may be transmitted using the same beam as used for the PDCCH scheduling the transmission. However, if the beam diversity using the activated transmit beams of certain CORESETs is used, then the order of the applied beams for different slots may be determined by cycling through CORESETs of the configured set for the multi-slot PDSCH, starting, for example, from the CORESET scheduling the transmission. This may allow transmitting the first PDSCH in the same slot as the scheduling PDCCH.

In an example embodiment, the UE may be configured with spatial diversity where a composite beam of at least two TCI states is simultaneously activated. For example, the UE may be configured with spatial diversity for multi-slot PDSCH transmission. In another example embodiment, the UE may have 3 TCI states: 0, 1, and 2 activated for PDSCH.

According to one example embodiment, a fixed diversity beam (TCI state) may be used for transmitting PDSCH with a composite beam of multiple TCI states. In Table 4 below, there is per slot, one fixed TCI state (TCI #2) and two changing TCI states (#0, #1) depending on the transmission slot number. Further, a fixed diversity beam may be explicitly configured or implicitly the lowest or highest TCI index used.

TABLE 4

| Multi-slot aggregation with spatial diversity with fixed diversity beam | | |
| --- | --- | --- |
| Index of activated TCI states for PDSCH | Transmission number in multi-slot PDSCH | Applied TCI states |
| 0 | 0 | 0, 2 |
| 1 | 1 | 1, 2 |
| 2 | 2 | 0, 2 |
|  | 3 | 1, 2 |

In another example embodiment, the applied TCI states may be cycled as shown in Table 5 below. For example, in the first slot, the TCI states 0 and 1 are used. In the next slot, TCI states 1 and 2 are used, etc. In certain example embodiments, the number of spatial diversity beams (Nd) may be configured by the network. For instance, in the above examples, the Nd=2, where two TCI states are simultaneously activated.

TABLE 5

| Multi-slot aggregation with spatial diversity with cycling set of diversity beam | | |
| --- | --- | --- |
| Index of activated TCI states for PDSCH | Transmission number in multi-slot PDSCH | Applied TCI states |
| 0 | 0 | 0, 1 |
| 1 | 1 | 1, 2 |
| 2 | 2 | 2, 0 |
|  | 3 | 0, 1 |

According to an example embodiment, the UE may be configured to perform certain functions in multi-slot PDSCH. For instance, the UE may receive a configuration for a multi-slot transmission mode for PDSCH with aggregationFactorDL>1. Here, the UE may receive configuration of whether or not beam diversity is applied for the multi-slot PDSCH. The UE may also receive configuration of transmit beams for PDSCH, including the TCI states. In addition, the UE may receive an activation of candidate transmit beams for PDSCH.

Furthermore, DCI scheduling the multi-slot PDSCH may also be received by the UE. In such a case, the UE may determine, from the received TCI field, the set of activated transmit beams to be used by the gNB for different PDSCHs in the multi-slot transmission. In particular, the UE may determine, from the DCI, whether or not (CSI trigger) associated CSI-RS with repetition "ON" is scheduled together with the PDSCHs. If so, the UE may determine the transmit beam for each CSI-RS transmitted in the beginning of the slot (before PDSCH) to be the same as for the PDSCH in the same slot. In other words, the UE may determine that QCL Type D source for the CSI-RS is the same as for the PDSCH in the same slot. The UE may also receive PDSCH in different slots applying an RX beam corresponding to each indicated TX beam.

According to other example embodiments, in multi-slot PDSCH, the gNB may decide to configure the UE with multi-slot PDSCH. One reason that the gNB may decide to do this may be because of the UE's high velocity, high estimated blocking probability, and a need for reducing beam reporting periodicity and selection to use opportunistic beamforming for the UE. The UE may be configured by the gNB with the set of transmit beams for PDSCH (TCI states), and some of the transmit beams may be activated to be candidate beams in scheduling multi-slot PDSCH.

Additionally, the gNB may indicate in DCI, which one of the activated transmit beams are used to transmit multi-slot PDSCH for the UE. For instance, TX beam switching may be applied for the PDSCHs in different slots as indicated via the TCI field in DCI. Moreover, the UE may be configured with a CSI-RS resources set with repetition "ON" to be associated with the multi-slot PDSCH, and TX beam switching may be applied for the CSI-RSs and PDSCHs in different slots as indicated via the TCI field in DCI. In an example embodiment, the same TX beam may be used for the CSI-RSs and the PDSCH in the same slot.

Figure 3:
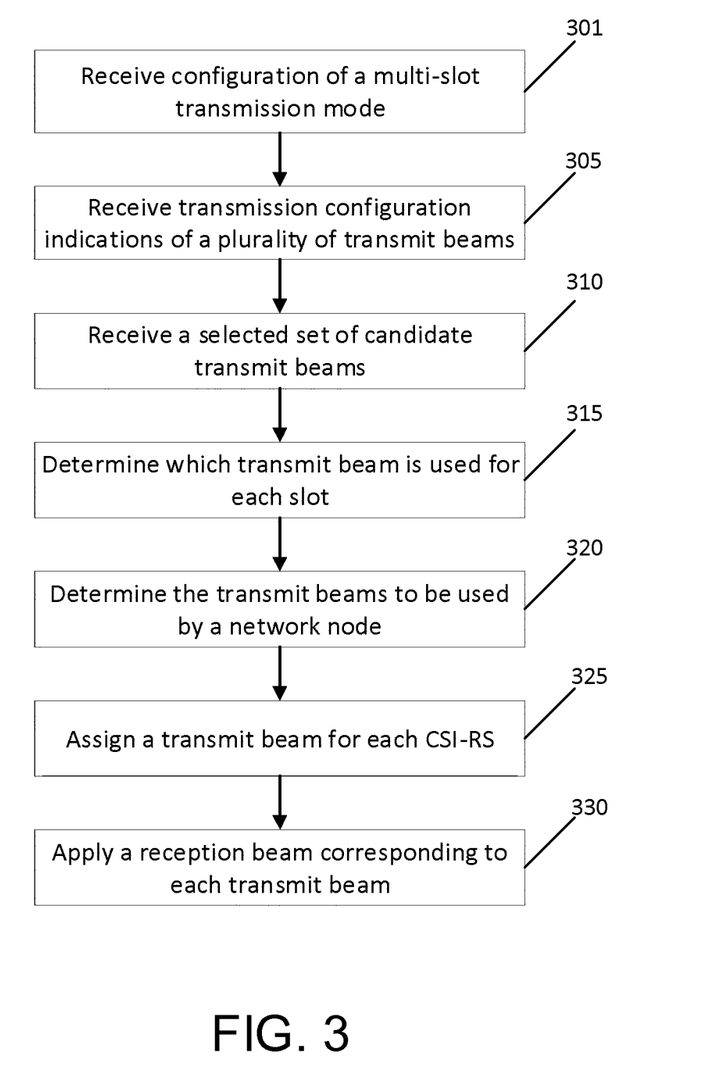
FIG. 3 illustrates an example flow diagram of a method according to an example embodiment.

FIG. 3 illustrates an example flow diagram of a method according to an example embodiment. In certain example embodiments, the flow diagram of FIG. 3 may be performed by a network element, such as a user equipment, mobile terminal, or any other similar mobile electronic device. For example, at 301, the method may include receiving configuration of a multi-slot transmission mode for a multi-slot communication channel. In an example embodiment, the UE may receive configuration whether or not beam diversity is applied for the multi-slot PDSCH. At 305, the method may include receiving, based on the configuration of the multi-slot transmission mode, transmission configuration indications of a plurality of transmit beams for slots in the multi-slot communication channel. That is, in an example embodiment, the UE may receive configuration of transmit beams for PDSCH (TCI states).

At 310, the method may include receiving a selected set of candidate transmit beams among the plurality of transmit beams for the slots in the multi-slot communication channel. At 315, the method may include determining, among the selected set of candidate transmit beams, which transmit beam is used for each slot in the multi-slot communication channel. The method may also include, at 320, determining, from the selected set of candidate transmit beams, the transmit beams to be used by a network node, such as a gNB, for each slot in the multi-slot communication channel. At 325, the method may also include assigning, from among the selected set of candidate transmit beams, a transmit beam for each CSI-RS. Then, at 330, the method may include applying a reception beam corresponding to each transmit beam used for each slot in the multi-slot communication channel. In an example embodiment, the transmit beam selected for each slot may be the same as the transmit beam selected for each CSI-RS. In other words, the UE may determine that QCL Type D source for the CSI-RS is the same as for the PDSCH in the same slot.

Figure 4:
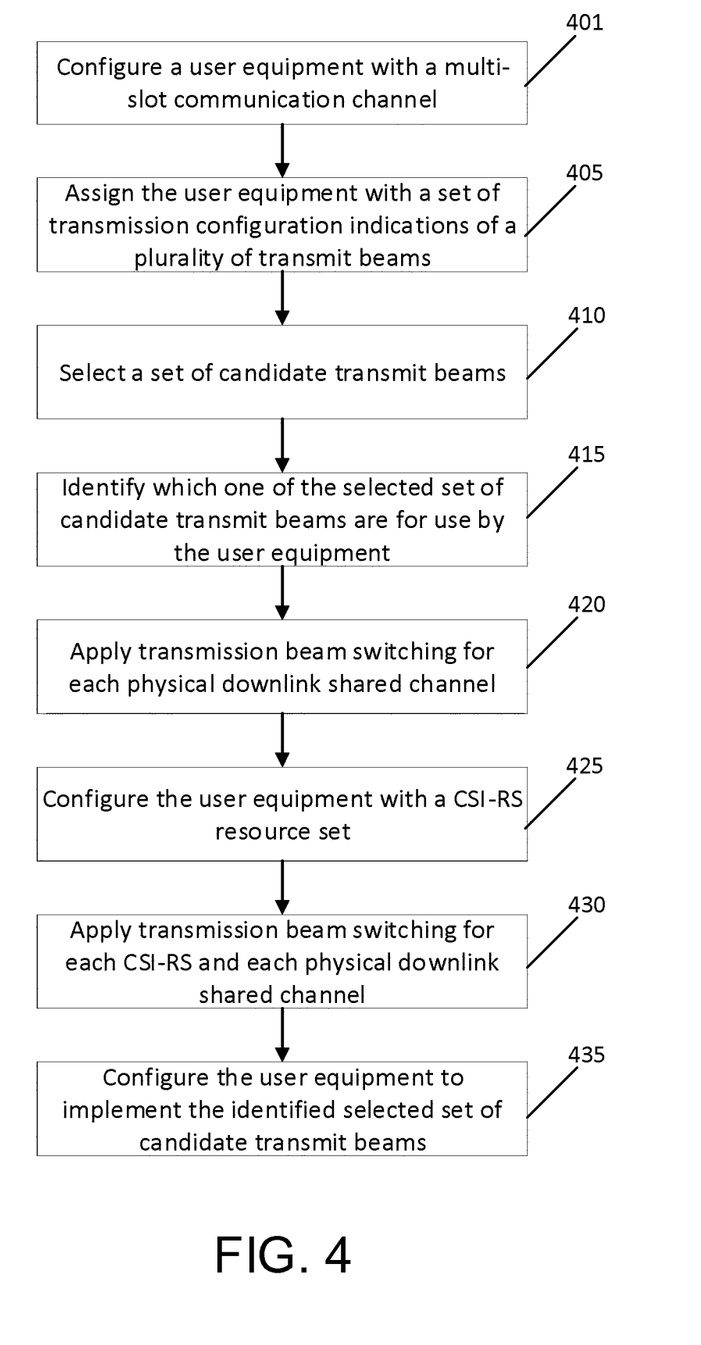
FIG. 4 illustrates an example flow diagram of another method according to an example embodiment.

FIG. 4 illustrates an example flow diagram of another method according to an example embodiment. In certain example embodiments, the flow diagram of FIG. 4 may be performed by a network node, such as a base station, node B, eNB, gNB, or any other access node, or one or more servers in a cloud configuration. For example, at 401, the method may include configuring a UE with a multi-slot communication channel. In an example embodiment, the multi-slot communication channel may include PDSCH. In addition, according to an example embodiment, the UE may be configured with multi-slot PDSCH due to the UE's high velocity, high estimated blocking probability, need for reducing beam reporting periodicity, and selection to use opportunistic beamforming for the UE.

The method may also include, at 405, assigning the user equipment with a set of transmission configuration indications of a plurality of transmit beams for slots in the multi-slot communication channel. For instance, the UE may be configured with a set of transmit beams for PDSCH (TCI states). At 410, the method may include select a set of candidate transmit beams among the plurality of transmit beams for the slots in the multi-slot communication channel. Further, at 415, the method may include identifying which one of the selected set of candidate transmit beams are for use by the user equipment. In an example embodiment, this may be done by indicating in DCI, which one of the selected transmit beams are used to transmit multi-slot PDSCH for the UE.

At 420, the method may include applying a transmission beam switching for each PDSCH of each slot in the multi-slot communication channel. Further, at 425, the method may include configuring the UE with a CSI-RS resource set, wherein each CSI-RS resource in the CSI-RS resource set may be associated with a corresponding slot in the multi-slot communication channel. In an example embodiment, the CSI-RS resource set may be configured with repetition "ON" to be associated with the multi-slot PDSCH. Additionally, at 430, the method may include applying transmission beam switching for each CSI-RS and each PDSCH in different slots as indicated via TCI field in DCI. According to an example embodiment, the same transmission beam switching may be used for the CSI-RSs and PDSCH in the same slot.

Figure 5A:
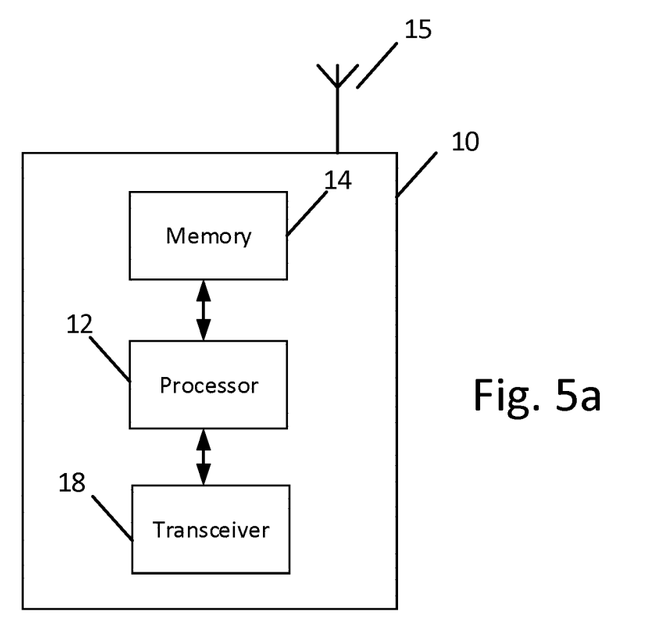
FIG. 5a illustrates a block diagram of an apparatus according to an example embodiment.

FIG. 5*a* illustrates an example of an apparatus 10 according to an example embodiment. In an example embodiment, apparatus 10 may be a node, host, or server in a communications network or serving such a network. For example, apparatus 10 may be a base station, a Node B, an evolved Node B (eNB), 5G Node B or access point, next generation Node B (NG-NB or gNB), WLAN access point, mobility management entity (MME), and/or subscription server associated with a radio access network, such as a GSM network, LTE network, 5G or NR.

It should be understood that, in some example embodiments, apparatus 10 may be comprised of an edge cloud server as a distributed computing system where the server and the radio node may be stand-alone apparatuses communicating with each other via a radio path or via a wired connection, or they may be located in a same entity communicating via a wired connection. For instance, in certain example embodiments where apparatus 10 represents a gNB, it may be configured in a central unit (CU) and distributed unit (DU) architecture that divides the gNB functionality. In such an architecture, the CU may be a logical node that includes gNB functions such as transfer of user data, mobility control, radio access network sharing, positioning, and/or session management, etc. The CU may control the operation of DU(s) over a front-haul interface. The DU may be a logical node that includes a subset of the gNB functions, depending on the functional split option. It should be noted that one of ordinary skill in the art would understand that apparatus 10 may include components or features not shown in FIG. 5*a*.

As illustrated in the example of FIG. 5*a*, apparatus 10 may include a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 5*a*, multiple processors may be utilized according to other embodiments. For example, it should be understood that, in certain embodiments, apparatus 10 may include two or more processors that may form a multiprocessor system (e.g., in this case processor 12 may represent a multiprocessor) that may support multiprocessing. In certain embodiments, the multiprocessor system may be tightly coupled or loosely coupled (e.g., to form a computer cluster).

Processor 12 may perform functions associated with the operation of apparatus 10, which may include, for example, precoding of antenna gain/phase parameters, encoding and decoding of individual bits forming a communication message, formatting of information, and overall control of the apparatus 10, including processes related to management of communication resources.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In an embodiment, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10.

In some embodiments, apparatus 10 may also include or be coupled to one or more antennas 15 for transmitting and receiving signals and/or data to and from apparatus 10. Apparatus 10 may further include or be coupled to a transceiver 18 configured to transmit and receive information. The transceiver 18 may include, for example, a plurality of radio interfaces that may be coupled to the antenna(s) 15. The radio interfaces may correspond to a plurality of radio access technologies including one or more of GSM, NB-IoT, LTE, 5G, WLAN, Bluetooth, BT-LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device).

In an embodiment, memory 14 may store software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software.

According to some embodiments, processor 12 and memory 14 may be included in or may form a part of processing circuitry or control circuitry. In addition, in some embodiments, transceiver 18 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to case an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

As introduced above, in certain embodiments, apparatus 10 may be a network node or RAN node, such as a base station, access point, Node B, eNB, gNB, WLAN access point, or the like. According to certain embodiments, apparatus 10 may be controlled by memory 14 and processor 12 to perform the functions associated with any of the embodiments described herein, such as those illustrated in FIGS. 1-4. In some example embodiments, for instance, apparatus 10 may be configured to perform a process for beam diversity for multi-slot PDSCH.

For example, in some example embodiments, apparatus 10 may be controlled by memory 14 and processor 12 to receive configuration of a multi-slot transmission mode for a multi-slot communication channel. Apparatus 10 may also be controlled by memory 14 and processor 12 to receive, based on the configuration of the multi-slot transmission mode, transmission configuration indications of a plurality of transmit beams for slots in the multi-slot communication channel. Apparatus 10 may further be controlled by memory 14 and processor 12 to receive a selected set of candidate transmit beams among the plurality of transmit beams for the slots in the multi-slot communication channel, and determine, among the selected set of candidate transmit beams, which transmit beam is used for each slot in the multi-slot communication channel. In addition, apparatus 10 may be controlled by memory 14 and processor 12 to apply a reception beam corresponding to each transmit beam used for each slot in the multi-slot communication channel.

Figure 5B:
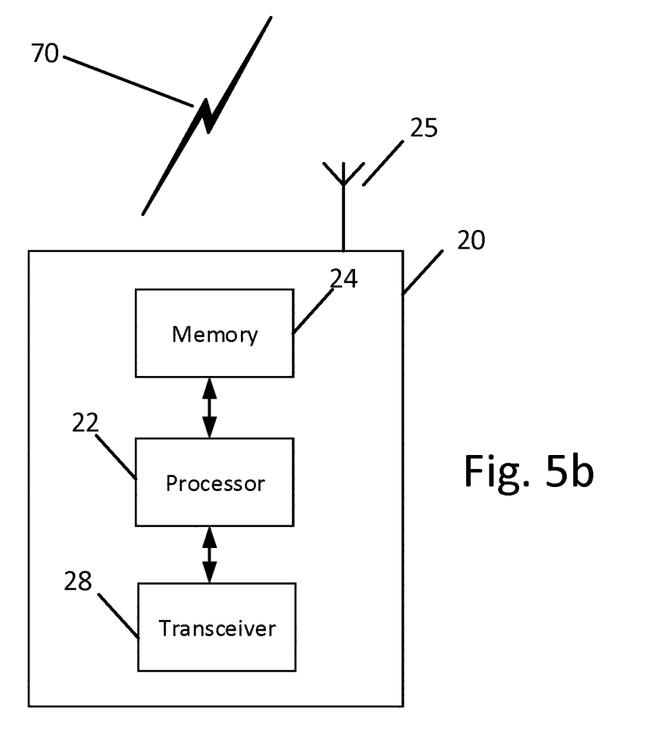
FIG. 5b illustrates a block diagram of another apparatus according to an example embodiment.

FIG. 5b illustrates an example of an apparatus 20 according to another example embodiment. In an example embodiment, apparatus 20 may be a node or element in a communications network or associated with such a network, such as a UE, mobile equipment (ME), mobile station, mobile device, stationary device, IoT device, or other device. As described herein, UE may alternatively be referred to as, for example, a mobile station, mobile equipment, mobile unit, mobile device, user device, subscriber station, wireless terminal, tablet, smart phone, IoT device or NB-IoT device, or the like. As one example, apparatus 20 may be implemented in, for instance, a wireless handheld device, a wireless plug-in accessory, or the like.

In some example embodiments, apparatus 20 may include one or more processors, one or more computer-readable storage medium (for example, memory, storage, or the like), one or more radio access components (for example, a modem, a transceiver, or the like), and/or a user interface. In some embodiments, apparatus 20 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 20 may include components or features not shown in FIG. 5b.

As illustrated in the example of FIG. 5b, apparatus 20 may include or be coupled to a processor 22 for processing information and executing instructions or operations. Processor 22 may be any type of general or specific purpose processor. In fact, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 5b, multiple processors may be utilized according to other embodiments. For example, it should be understood that, in certain embodiments, apparatus 20 may include two or more processors that may form a multiprocessor system (e.g., in this case processor 22 may represent a multiprocessor) that may support multiprocessing. In certain embodiments, the multiprocessor system may be tightly coupled or loosely coupled (e.g., to form a computer cluster).

Processor 22 may perform functions associated with the operation of apparatus 20 including, as some examples, precoding of antenna gain/phase parameters, encoding and decoding of individual bits forming a communication message, formatting of information, and overall control of the apparatus 20, including processes related to management of communication resources.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In an embodiment, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20.

In some embodiments, apparatus 20 may also include or be coupled to one or more antennas 25 for receiving a downlink signal and for transmitting via an uplink from apparatus 20. Apparatus 20 may further include a transceiver 28 configured to transmit and receive information. The transceiver 28 may also include a radio interface (e.g., a modem) coupled to the antenna 25. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 28 may be configured to modulate information on to a carrier waveform for transmission by the antenna(s) 25 and demodulate information received via the antenna(s) 25 for further processing by other elements of apparatus 20. In other example embodiments, transceiver 28 may be capable of transmitting and receiving signals or data directly. Additionally or alternatively, in some example embodiments, apparatus 10 may include an input and/or output device (I/O device). In certain example embodiments, apparatus 20 may further include a user interface, such as a graphical user interface or touchscreen.

In an embodiment, memory 24 stores software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software. According to an example embodiment, apparatus 20 may optionally be configured to communicate with apparatus 10 via a wireless or wired communications link 70 according to any radio access technology, such as NR.

According to some embodiments, processor 22 and memory 24 may be included in or may form a part of processing circuitry or control circuitry. In addition, in some embodiments, transceiver 28 may be included in or may form a part of transceiving circuitry.

As discussed above, according to some embodiments, apparatus 20 may be a UE, mobile device, mobile station, ME, IoT device and/or NB-IoT device, for example. According to certain embodiments, apparatus 20 may be controlled by memory 24 and processor 22 to perform the functions associated with example embodiments described herein. For example, in some embodiments, apparatus 20 may be configured to perform one or more of the processes depicted in FIGS. 1-4. For example, in certain embodiments, apparatus 20 may be configured to perform a process for beam diversity for multi-slot PDSCH.

According to other example embodiments, apparatus 20 may be controlled by memory 14 and processor 12 to configure a user equipment with a multi-slot communication channel, assign the user equipment with a set of transmission configuration indications of a plurality of transmit beams for slots in the multi-slot communication channel. Apparatus 20 may also be controlled by memory 14 and processor 12 to select a set of candidate transmit beams among the plurality of transmit beams for the slots in the multi-slot communication channel, and identify which one of the selected set of candidate transmit beams are for use by the user equipment. Further, apparatus 20 may be controlled by memory 14 and processor 12 to configure the user equipment to implement the identified selected set of candidate transmit beams for the slots in the multi-slot communication channel. In addition, apparatus 20 may be controlled by memory 14 and processor 12 to apply transmission beam switching for each physical downlink shared channel of each slot in the multi-slot communication channel, and configuring the user equipment with a CSI-RS resource set. Apparatus 20 may also be controlled by memory 14 and processor 12 to apply transmission beam switching for each CSI-RS and each physical downlink shared channel of each slot in the multi-slot communication channel.

The above embodiments may provide for significant improvements to the functioning of a network and/or to the functioning of the network entities within the network, or the UE communicating with the network. For example, the above example embodiments may provide for a more robust and reliable transmission scheme in multi-slot PDSCH by introducing beam diversity. Further, ultra reliability and low latency communication (URLCC) services may especially benefit greatly from the above example embodiments that provide spatial diversity (e.g. against blockages and sudden interference characteristics when operating using narrow transmit and receive beams). It may also be possible to implement transmission schemes without increasing the DCI size.

According to other example embodiments, it may be possible to provide multi TCI state indication by re-interpreting the TCI state indicator in DCI when aggregation-FactorDL>1. This may enable multi-beam diversity for the multi-slot PDSCH that is not previously available, and may be beneficial in a highly blockaging environment, high mobility or limiting the required beam reporting frequency. The various example embodiments described herein are not so limited to reinterpretation of a specified DCI format, but are provided only as examples.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

In some example embodiments, the functionality of any of the methods, processes, signaling diagrams, algorithms or flow charts described herein may be implemented by software and/or computer program code or portions of code stored in memory or other computer readable or tangible media, and executed by a processor.

In some example embodiments, an apparatus may be included or be associated with at least one software application, module, unit or entity configured as arithmetic operation(s), or as a program or portions of it (including an added or updated software routine), executed by at least one operation processor. Programs, also called program products or computer programs, including software routines, applets and macros, may be stored in any apparatus-readable data storage medium and include program instructions to perform particular tasks.

A computer program product may comprise one or more computer-executable components which, when the program is run, are configured to carry out some example embodiments. The one or more computer-executable components may be at least one software code or portions of it. Modifications and configurations required for implementing functionality of an example embodiment may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. Although the above embodiments refer to 5G NR and LTE technology, the above embodiments may also apply to any other present or future 3GPP technology, such as LTE-advanced, and/or fourth generation (4G) technology.

| Partial Glossary | |
|---|---|
| AL | Aggregation Level |
| DCI | Downlink Control Information |
| eNB | Enhanced Node B (LTE base station) |
| EVM | Error Vector Magnitude with Memory |
| FFT | Fast Fourier Transformation |
| gNB | 5G or NR Base Station |
| LTE | Long Tenn Evolution |
| MIMO | Multiple Input Multiple Output |
| NR | New Radio |
| NR-U | New Radio Unlicensed |
| PDCCH | Physical Downlink Control Channel |
| PDSCH | Physical Downlink Shared Channel |
| RF | Radio Frequency |
| TB | Transport Block |
| TCI | Transmission |
| UE | User Equipment |

We claim:
1. A method, comprising:
receiving configuration of a multi-slot transmission mode for a multi-slot communication channel;
receiving transmission configuration indications of a plurality of transmit beams for slots in the multi-slot communication channel;

receiving a selected set of candidate transmit beams among the plurality of transmit beams for the slots in the multi-slot communication channel;

determining, among the selected set of candidate transmit beams, which transmit beam is used for each slot in the multi-slot communication channel by cycling the selected set of candidate transmit beams across the slots in the multi-slot communication channel; and applying a reception beam corresponding to each transmit beam used for each slot in the multi-slot communication channel.

2. The method according to claim 1, wherein the determining is performed based on received downlink control information.

3. The method according to claim 1, wherein each slot of the multi-slot communication channel comprises a corresponding physical downlink shared channel.

4. The method according to claim 1, further comprising determining, from the selected set of candidate transmit beams, the transmit beams to be used by a network node for each slot in the multi-slot communication channel.

5. The method according to claim 1, wherein each slot in the multi-slot communication channel comprises a corresponding channel state information-reference signal.

6. The method according to claim 5, further comprising assigning, from among the selected set of candidate transmit beams, a transmit beam for each channel state information-reference signal.

7. The method according to claim 1, wherein the transmit beam selected for each of the slots in the multi-slot communication channel is the same as the transmit beam selected for each channel state information-reference signal.

8. An apparatus, comprising:
at least one processor; and
at least one memory comprising computer program code,
the at least one memory and computer program code configured, with the at least one processor to cause the apparatus at least to
receive configuration of a multi-slot transmission mode for a multi-slot communication channel;
receive transmission configuration indications of a plurality of transmit beams for slots in the multi-slot communication channel;
receive a selected set of candidate transmit beams among the plurality of transmit beams for the slots in the multi-slot communication channel;
determine, among the selected set of candidate transmit beams, which transmit beam is used for each slot in the multi-slot communication channel by cycling the selected set of candidate transmit beams across the slots in the multi-slot communication channel; and
apply a reception beam corresponding to each transmit beam used for each slot in the multi-slot communication channel.

9. The apparatus according to claim 8, wherein the determining is performed based on received downlink control information.

10. The apparatus according to claim 8, wherein each slot of the multi-slot communication channel comprises a corresponding physical downlink shared channel.

11. The apparatus according to claim 8, wherein the at least one memory and computer program code are further configured, with the at least one processor to cause the apparatus at least to determine, from the selected set of candidate transmit beams, the transmit beams to be used by a network node for each slot in the multi-slot communication channel.

12. The apparatus according to claim 8, wherein each slot in the multi-slot communication channel comprises a corresponding channel state information-reference signal.

13. The apparatus according to claim 12, wherein the at least one memory and computer program code are further configured, with the at least one processor to cause the apparatus at least to assign, from among the selected set of candidate transmit beams, a transmit beam for each channel state information-reference signal.

14. An apparatus, comprising:
at least one processor; and
at least one memory comprising computer program code,
the at least one memory and computer program code configured, with the at least one processor, to cause the apparatus at least to
configure a user equipment with a multi-slot communication channel;
assign the user equipment with a set of transmission configuration indications of a plurality of transmit beams for slots in the multi-slot communication channel;
select a set of candidate transmit beams among the plurality of transmit beams for the slots in the multi-slot communication channel;
identify which one of the selected set of candidate transmit beams is for use by the user equipment for each slot in the multi-slot communication channel;
apply transmit beam switching between slots, wherein the transmit beam switching comprises cycling the selected set of candidate transmit beams across the slots in the multi-slot communication channel; and
configure the user equipment to implement the selected set of candidate transmit beams for the slots in the multi-slot communication channel.

15. The apparatus according to claim 14, wherein each slot of the multi-slot communication channel comprises a physical downlink shared channel.

16. The apparatus according to claim 14, wherein the at least one memory and computer program code are further configured, with the at least one processor, to cause the apparatus at least to apply transmission beam switching for each physical downlink shared channel of each slot in the multi-slot communication channel.

17. The apparatus according to claim 14, wherein the at least one memory and computer program code are further configured, with the at least one processor, to cause the apparatus at least to configuring the user equipment with a channel state information-reference signal resource set, and wherein each channel state information-reference signal resource in the channel state information-reference signal resource set is associated with a corresponding slot in the multi-slot communication channel.

18. The apparatus according to claim 14, wherein the at least one memory and computer program code are further configured, with the at least one processor, to cause the apparatus at least to apply transmission beam switching for each channel state information-reference signal and each physical downlink shared channel of each slot in the multi-slot communication channel.

19. The apparatus according to claim 14, wherein the same transmission beam switching is used for each channel state information-reference signal and each physical downlink shared channel.

* * * * *